United States Patent
Gatsonides

(10) Patent No.: US 6,266,627 B1
(45) Date of Patent: Jul. 24, 2001

(54) METHOD AND APPARATUS FOR DETERMINING THE SPEED AND LOCATION OF A VEHICLE

(76) Inventor: Tom Gatsonides, Bentveldweg 10, NL-2116 EH Bentveld (NL)

( * ) Notice: Subject to any disclaimer, the term of this patent is extended or adjusted under 35 U.S.C. 154(b) by 0 days.

(21) Appl. No.: 09/155,624

(22) PCT Filed: Apr. 1, 1997

(86) PCT No.: PCT/NL97/00163

§ 371 Date: Jul. 16, 1999

§ 102(e) Date: Jul. 16, 1999

(87) PCT Pub. No.: WO97/37242

PCT Pub. Date: Oct. 9, 1997

(30) Foreign Application Priority Data

Apr. 1, 1996 (NL) .................................................... 1002751

(51) Int. Cl.[7] ............................... G01S 13/00; G08G 1/00
(52) U.S. Cl. ......................... 702/143; 702/149; 702/150; 342/107; 342/109; 340/936; 340/937
(58) Field of Search .................................... 702/142–143, 702/149–150, 159; 701/117, 119; 342/104–109, 128, 133; 340/933, 936, 937

(56) References Cited

U.S. PATENT DOCUMENTS

| | | | | |
|---|---|---|---|---|
| 4,988,994 | * | 1/1991 | Loeven ................................ | 340/936 |
| 5,041,828 | * | 8/1991 | Loeven ................................ | 340/936 |
| 5,231,393 | * | 7/1993 | Strickland .......................... | 340/936 |
| 5,359,404 | * | 10/1994 | Dunne ................................ | 342/105 |
| 5,402,346 | * | 3/1995 | Lion et al. .......................... | 701/117 |
| 5,483,242 | * | 1/1996 | Grein et al. ........................ | 342/128 |
| 5,767,794 | * | 6/1998 | Borsch et al. ...................... | 701/117 |
| 5,806,020 | * | 9/1998 | Zykan ................................ | 702/159 |

FOREIGN PATENT DOCUMENTS

| | | |
|---|---|---|
| 0588768 | 3/1994 | (EP) . |
| 1315533 | * 5/1973 | (GB) . |
| 2035006 | 6/1980 | (GB) . |

OTHER PUBLICATIONS

Elterich, A. "Vergleich unterschiedlicher mehrzielfähiger Radarverfahren zur Bestimmung von Geschwindigkeit und Entferrung im Nahbereich", Kleinheubacher Berichte, vol. 35, pp. 731–740.

* cited by examiner

Primary Examiner—Kamini Shah
Assistant Examiner—Bryan Bui
(74) Attorney, Agent, or Firm—Webb Ziesenheim Logsdon Orkin & Hanson, P.C.

(57) ABSTRACT

Disclosed is a method and apparatus for measuring the speed of a vehicle by transmitting a wave beam directed at the vehicle, receiving a part of the wave beam reflected by the vehicle, comparing the reflected beam part with the transmitted wave beam and deriving from this comparison the speed of the vehicle, wherein during the speed measurement the position of the vehicle is also determined. A vehicle committing an offense can thus be identified unambiguously in a recording which is made after detection of the speeding offense. The speed of the vehicle can be determined from a difference in wavelength detected during the comparison between the reflected beam part and the transmitted wave beam, while the position of the vehicle is determined from a time lag detected during the comparison between the moment of transmitting and the moment of receiving the reflected beam part.

13 Claims, 3 Drawing Sheets

METHOD AND APPARATUS FOR DETERMINING THE SPEED AND LOCATION OF A VEHICLE

BACKGROUND OF THE INVENTION

1) Field of the Invention

The invention relates co a method for measuring the speed of a vehicle by transmitting a wave beam directed at the vehicle, receiving a part of the wave beam reflected by the vehicle, comparing the reflected beam part with the transmitted wave beam and deriving from this comparison the speed of the vehicle. Such a method is generally known and is frequently used by police in the form of radar speed measurements.

2) Description of the Prior Art

In the known method a radar beam is transmitted at an acute angle to a road axis from a fixed, generally concealed position along the road. When a vehicle passes through the beam a part of the beam is reflected. This reflected part is received at the measuring point and the frequency of the reflected beam is compared with the (exact) frequency of the transmitted beam. Because the beam is reflected by a moving vehicle it will undergo, as a result of the Doppler effect, a frequency change which is a measure for both the speed of movement and the direction of movement of the vehicle. When it is found from the comparison of the transmitted and received frequency that the speed of the vehicle exceeds the maximum allowed speed at that location a warning signal is generated. This signal is generally used to activate a camera whereby a recording is made of the vehicle committing the speeding offence. This recording then also shows the relevant data such as date and time of the recording and the measured speed.

Problems occur in the known method when it is applied on roads with a number of traffic lanes, such as motorways. Here several vehicles may pass through the measuring beam simultaneously. If one of these vehicles commits a speeding offence it is often not possible to determine indisputably which vehicle this was. When the speed measurement is combined with making a recording, complicated and time-consuming processing of the recording is required in order to determine the offender therefrom on the basis of secondary indications.

SUMMARY OF THE INVENTION

The invention now has for its object to provide a method of the above described type, wherein this drawback does not occur. This is achieved according to the invention in that during the speed measurement the position of the vehicle is determined. By determining not only the speed but simultaneously also the position of the vehicle, it is still possible to identify with certainty the vehicle which committed the offence, also when a number of vehicles passes through the beam.

An efficient manner of position determination is achieved when the position of the vehicle, as well as the speed thereof, is determined by comparing the reflected beam part with the transmitted wave beam. The speed of the vehicle can advantageously be determined from a difference in wavelength detected during the comparison between the reflected beam part and the transmitted wave beam, and the position of the vehicle can be determined from a time lag detected during the comparison between the moment of transmitting and the moment of receiving the reflected beam part. Both the speed and the position of the vehicle are thus determined with a single measurement. It will further be apparent that instead of the difference in wavelength the frequency change which after all is associated therewith could also be measured.

The wave beam is preferably transmitted in pulse form. By using separate wave pulses the time which has lapsed between the moment of transmission and the moment of reception can be determined unequivocally.

When during the speed measurement the direction of travel of the vehicle is also determined, even more certainty is obtained concerning the identity of the offending vehicle.

The wave beam is preferably transmitted at an acute angle to the direction of movement of the vehicle. A reliable measurement is thus obtained which can be performed from a concealed position.

The invention also relates to an apparatus for performing the above described method. According to the invention such an apparatus, which is provided with means for generating and transmitting a directed wave beam, means for receiving a part of the wave beam reflected by a vehicle and means for comparing the reflected beam part with the transmitted beam and deriving the speed of the vehicle from this comparison, is characterized by means for determining the position of the vehicle during the speed measurement.

BRIEF DESCRIPTION OF THE DRAWINGS

The invention is now elucidated on the basis of an embodiment, wherein reference is made to the annexed drawing, wherein.

DESCRIPTION OF THE PREFERRED EMBODIMENTS

Figure 1:
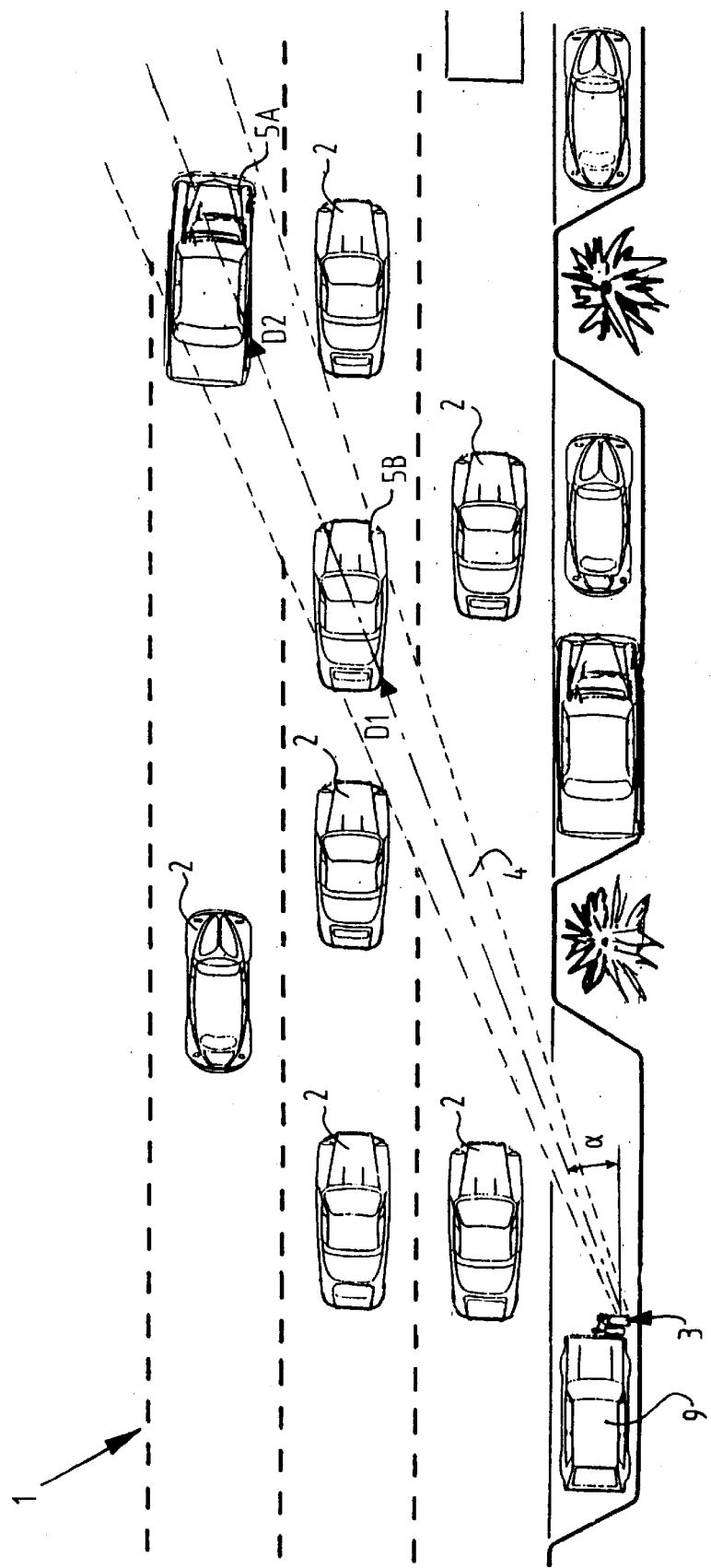
FIG. 1 shows a top view of the use of the apparatus according to the invention in a speed measurement.

In order to measure the speed of vehicles 2 travelling on a multi-lane highway 1 (FIG. 1) a speed measuring apparatus 3 according to the present invention is disposed along the road. The apparatus 3 can herein be incorporated in a vehicle 9, for instance an inconspicuous police patrol car. The apparatus 3 transmits a wave beam 4, for instance a radar beam, over the road 1 at an acute angle α of for instance 20° to the direction of movement of vehicles 2. When a vehicle 5A or 5B passes through the beam 4, a part of beam 4 is reflected. By comparing the frequency of the reflected part of the beam with the transmission frequency, the speed of vehicle 5A or 5B can be determined using the Doppler effect.

Because the road 1 has a number of traffic lanes 6 it is conceivable that, as shown, a number of vehicles 5A and 5B pass through the beam virtually simultaneously. In order to still be able to determine indisputably in these cases which of vehicles 5A or 5B is committing a speeding offense, the position of the vehicle, in this case its distance from measuring apparatus 3, is determined simultaneously with its speed.

Figure 2A:
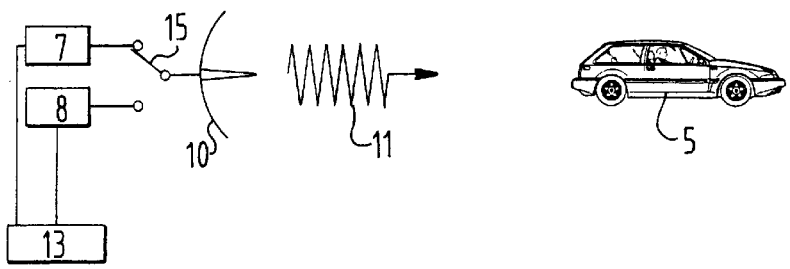
FIGS. 2A to 2C show a schematic view of the measuring method according to the invention.
Figure 2B:
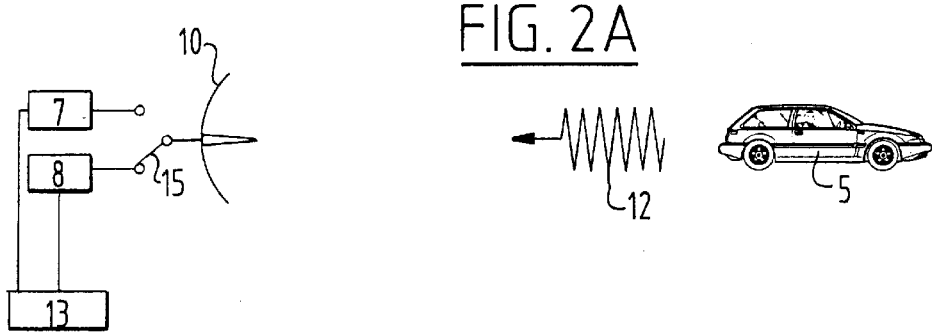
Figure 2C:
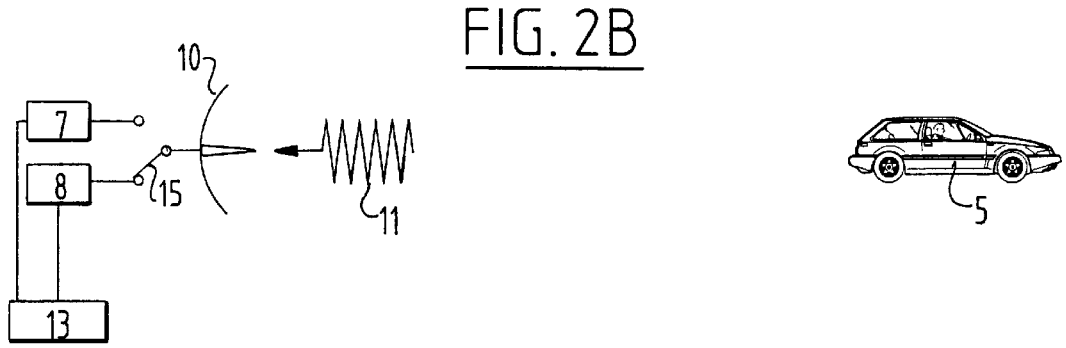

For this purpose the wave beam is transmitted in pulse form and the time is measured between the moment that such a wave pulse 11 is transmitted by the beam generating and transmitting means 7 (FIG. 2A) and the moment that a part 12 of this wave pulse, which is reflected by a passing vehicle (FIG. 2B), is received again by receiving means a (FIG. 2C). Because use is made of separate wave pulses, of which the moment of transmission is known in each case and which are therefore as it were "recognized" by the receiving means, the distance from the measuring apparatus 3 of the vehicle by which the wave pulse is reflected can be determined without difficulty. Transmitting means 7 and receiving means a herein make use, with interposing of a selector switch 15, of a collective antenna 10, which is shown here schematically. Transmitting means 7 and receiving means 8 are each further connected to a central control unit 13, in which are arranged the means for comparing the frequency or wavelength of the transmitted and reflected beam and for measuring the time which has lapsed between transmitting and receiving. The central control unit 13 also contains the means for determining from this comparison the speed and direction of travel of the vehicle as well as its distance from measuring apparatus 3. The starting point for determining the speed and travel direction of the vehicle are per se known relations between the frequency change and the speed of the reflecting vehicle resulting from the Doppler effect. The distance of the vehicle from the measuring apparatus is simply determined by multiplying the measured time by the known propagation velocity of the wave beam.

When a speeding offense is determined, a warning signal is generated. Herein is indicated how great the measured speed is and what is the distance of the vehicle from the apparatus. The detected direction of travel can also be indicated. This warning signal can be used to activate a camera, whereby a recording is made. The speed and distance can be shown in the recording. From the distance can also be directly determined in which lane the offender is travelling. The comparing means can further be programmed such that they ignore reflected beams which are received within a determined time of the moment of transmitting. To this end the measured time is compared with an adjustable lower threshold value. The speed measurement can thus be limited for instance to the left-hand lane, which is after all the furthest removed from measuring apparatus 3 and in which the highest speeds will generally be reached. By also comparing the measured time with an upper threshold value, a measuring window can be adjusted whereby the measurement can be limited to one of the middle lanes. When the measurement is limited to the left-hand lane, reflections from oncoming traffic in the other lanes can also be filtered out in this manner. This same effect can be achieved by determining the travel direction of the vehicle, which follows simply from the nature of the measured frequency change (frequency increase or decrease).

Figure 3:
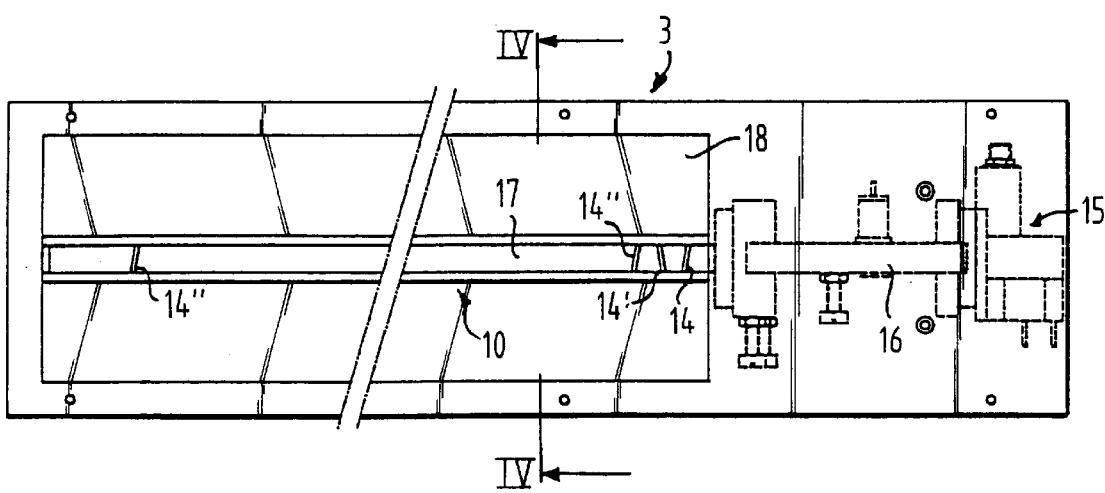
FIG. 3 shows a front view of the beam generating and transmitting means of the apparatus shown in FIG. 1.
Figure 4:
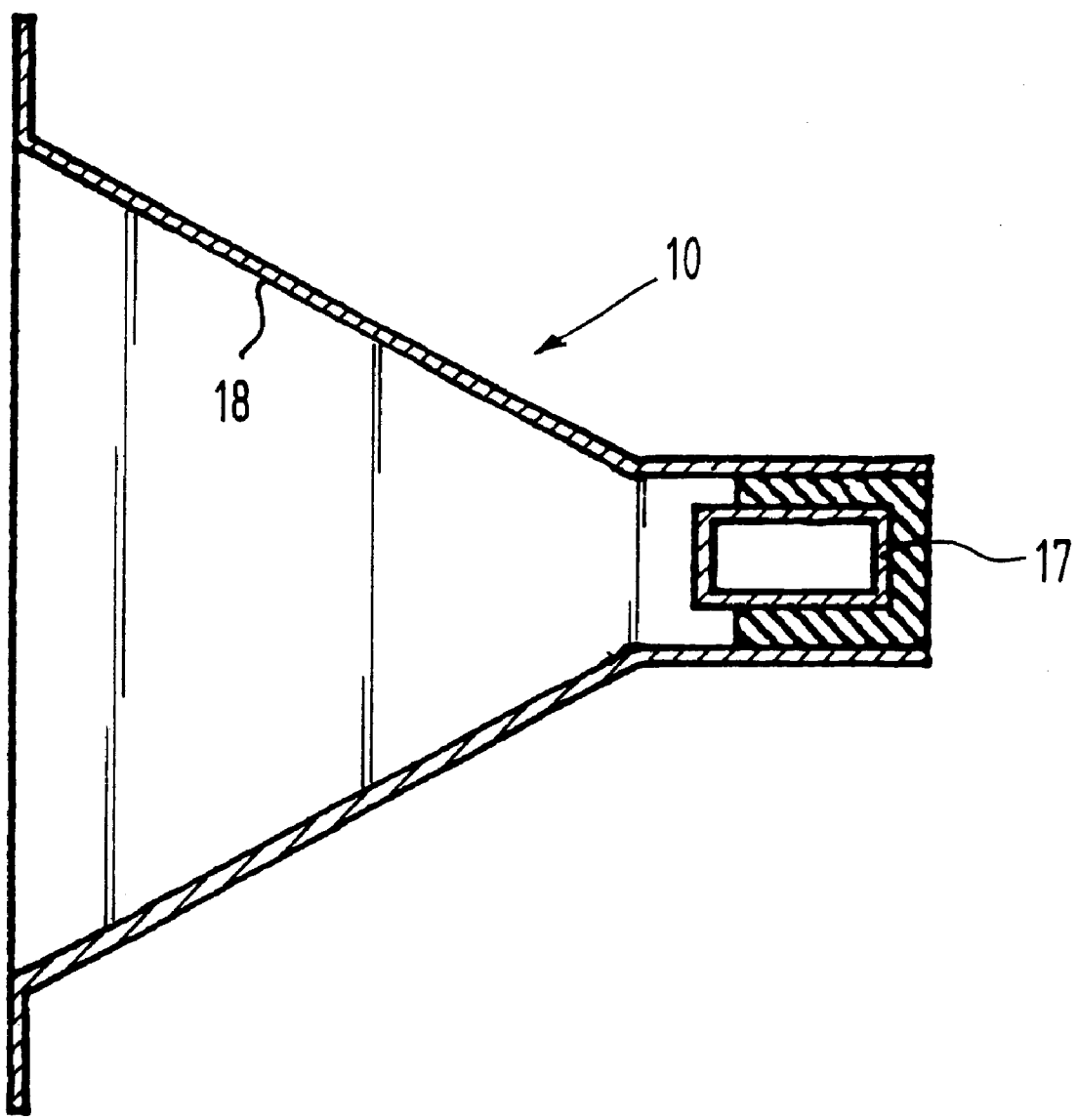
FIG. 4 shows a cross section along the line IV—IV in FIG. 3.

In order to direct wave beam 4 at an acute angle over the road 1 without having to rotate the entire measuring apparatus 3 through this angle, use is made of an antenna 10 with a large plurality of slots 14, 14', . . . , 14n (FIG. 3), a so-called slotted array antenna. Integrated in antenna 10 are the transmitting means 7 which take the form of an oscillator 15, which is connected over a mixing block 16 to an elongate wave guide 17, in which are arranged the slot-like transmitting apertures 14, 14', . . . , 14n. The wave guide 17 is arranged in a dish 18 of horn-shaped cross section which forms the actual antenna (FIG. 4). The distribution of the slots 14, 14', . . . , 14n over the length of wave guide 17 and their specific orientation, in the shown example at an angle of approximately 60 degrees to the longitudinal axis of the wave guide, allows the wave beam to be transmitted at an angle α relative to the normal of antenna 10 (FIG. 1). This is of particular importance when, as in the shown example, measuring apparatus 3 is incorporated in a vehicle 9, since the required installation space is considerably limited thereby.

What is claimed is:

1. A method for measuring the speed of a vehicle comprising the steps of transmitting a wave beam directed at the vehicle, receiving a part of the wave beam reflected by the vehicle, comparing the reflected beam part with the transmitted wave beam, deriving from this comparison both the speed and the position of the vehicle, comparing the measured speed with a maximum allowed speed, and generating a warning signal when a speeding offense is determined, wherein the position of the vehicle is determined from a time lag detected during the comparison between the moment of transmitting and the moment of receiving the reflected beam part, and the speed of the vehicle is derived when the position of the vehicle is determined to be within a desired traffic lane to correspond to a defined time that is compared within a measuring window.

2. The method as claimed in claim 1, wherein said warning signal is used to activate a camera for making a record, and the measured speed and distance of the vehicle are included in the recording.

3. The method as claimed in claim 1, wherein the speed of the vehicle is determined from a difference in wavelength detected during the comparison between the reflected beam part and the transmitted wave beam.

4. The method as claimed in claim 3, wherein the vehicle is within the desired traffic lane when the detected time lag is within the measuring window defined by a lower and/or an upper threshold value(s).

5. The method as claimed in claim 1, wherein the wave beam is transmitted in pulse form.

6. The method as claimed in claim 1, wherein during the speed measurement the direction of travel of the vehicle is also determined.

7. An apparatus for measuring the speed of a vehicle comprising means for generating and transmitting a directed wave beam, means for receiving a part of the wave beam reflected by a vehicle, means for comparing the reflected beam part with the transmitted beam and deriving both speed and the position of the vehicle from this comparison, means for comparing the measured speed with a maximum allowed speed, and means generating a warning signal when a speeding offense is determined, wherein the position determining means derives the position of the vehicle from a measured time lag, and the speed determining means derives the speed of the vehicle when the position of the vehicle is determined to be within a desired traffic lane to correspond to a defined time that is compared within a measuring window.

8. The speed measuring apparatus as claimed in claim 7, further including a camera controlled by the speed measur ing apparatus for making a recording when the speeding offense is determined, and arranged for showing the measured speed and position of the vehicle.

9. The speed measuring apparatus as claimed in claim 7, wherein the comparing means compares the wavelength of the reflected beam part with that of the transmitted beam, in order to derive the speed of the vehicle from a detected difference in wavelength.

10. The speed measuring apparatus as claimed in claim 9, wherein the comparing means compares the detected time lag with a lower and/or an upper threshold value defining the measuring window that corresponds to the desired traffic lane and ignores reflected beams which are received outside said measuring window.

11. The speed measuring apparatus as claimed in claim 9, wherein the comparing means derives the direction of travel of the vehicle from the detected difference in wavelength.

12. The speed measuring apparatus as claimed in claim 7, wherein the beam generating and transmitting means generates and transmits a wave beam in the form of a pulse.

13. The speed measuring apparatus as claimed in claim 7, wherein the beam generating and transmitting means includes an antenna provided with slots for transmitting the wave beam at an acute angle to the direction of movement of the vehicle.

* * * * *

UNITED STATES PATENT AND TRADEMARK OFFICE
CERTIFICATE OF CORRECTION

| | | |
|---|---|---|
| PATENT NO. | : 6,266,627 B1 | Page 1 of 1 |
| APPLICATION NO. | : 09/155624 | |
| DATED | : July 24, 2001 | |
| INVENTOR(S) | : Tom Gatsonides | |

It is certified that error appears in the above-identified patent and that said Letters Patent is hereby corrected as shown below:

Title Page, [56] References Cited, FOREIGN PATENT DOCUMENTS, first reference, "0588768" should read --0588687--.

Column 1 Line 8, "relates co" should read --relates to--.

Column 4 Line 67 to Column 5 Line 1, Claim 8, "measur ing" should read --measuring--.

Signed and Sealed this

Twenty-fifth Day of March, 2008

JON W. DUDAS
*Director of the United States Patent and Trademark Office*